(12) United States Patent
Lee

(10) Patent No.: US 7,039,439 B2
(45) Date of Patent: May 2, 2006

(54) COVER BODY SLIDING/LOCATION STRUCTURE OF SUBSCRIBER IDENTITY MODULE CONNECTOR

(75) Inventor: Ipson Lee, Taoyuan (TW)

(73) Assignee: Super Link Electronics Co., Ltd., Taoyuan (TW)

( * ) Notice: Subject to any disclaimer, the term of this patent is extended or adjusted under 35 U.S.C. 154(b) by 419 days.

(21) Appl. No.: 10/680,124

(22) Filed: Oct. 8, 2003

(65) Prior Publication Data
US 2005/0079891 A1   Apr. 14, 2005

Related U.S. Application Data

(63) Continuation-in-part of application No. 10/680,121, filed on Oct. 8, 2003, now Pat. No. 6,805,570.

(51) Int. Cl.
*H04M 1/00* (2006.01)
(52) U.S. Cl. .......... 455/558; 455/348; 379/357.1; 379/357.2; 235/441; 235/453
(58) Field of Classification Search .......... 455/334, 455/348, 550.1, 557, 558; 235/380, 439, 235/441, 453, 486; 379/355.01, 356, 357.1, 379/2
See application file for complete search history.

(56) References Cited

U.S. PATENT DOCUMENTS 5,257,414 A  * 10/1993 Trahan et al. ............... 455/558
6,976,864 B1 * 12/2005 Huang ........................ 439/326

* cited by examiner

*Primary Examiner*—Nguyen T. Vo
*Assistant Examiner*—Nhan T. Le
(74) *Attorney, Agent, or Firm*—Rosenberg, Klein & Lee (57) ABSTRACT

A cover body sliding/locating structure of SIM connector includes a plastic main body formed with multiple terminal cavities in which multiple terminals are inlaid. Two sides of one end of the plastic main body being respectively formed with two guide pins. A cover body has two sides of one end are respectively bent to form two cartridge sections for pivotally connecting with the guide pins of the plastic main body. At least one projecting locating section projects from inner side of each cartridge section for locating the cover body in a position where the cover body can be turned up or latched with the plastic main body. A projecting stopper board is formed at an opening of a second end of the cartridge section for stopping the guide pin. An L-shaped hook section downward projects from each lateral edge of the cover body for correspondingly latching with a locating block of the plastic main body.

4 Claims, 10 Drawing Sheets

PRIOR ART

COVER BODY SLIDING/LOCATION STRUCTURE OF SUBSCRIBER IDENTITY MODULE CONNECTOR

CROSS-REFERENCE TO RELATED APPLICATION

This application is a Continuation-In-Part Application of U.S. patent application Ser. No. 10/680,121 filed Oct. 8, 2003 now U.S. Pat No. 6,805,570, entitled "A Subscriber Identity Module Connector With Cover Board Grounding Structure" filed on same day.

BACKGROUND OF THE INVENTION

Field of the Invention

The present invention is related to a cover body sliding/locating structure of subscriber identity module (SIM) connector, and more particularly to a cover body of the SIM connector. Two sides of one end of the cover body are respectively bent to form two cartridge sections for pivotally connecting with the guide pins of the plastic main body. A projecting locating section is disposed on inner side of each cartridge section for locating the cover body in a position where the cover body can be turned up or latched with the plastic main body.

Figure 1:
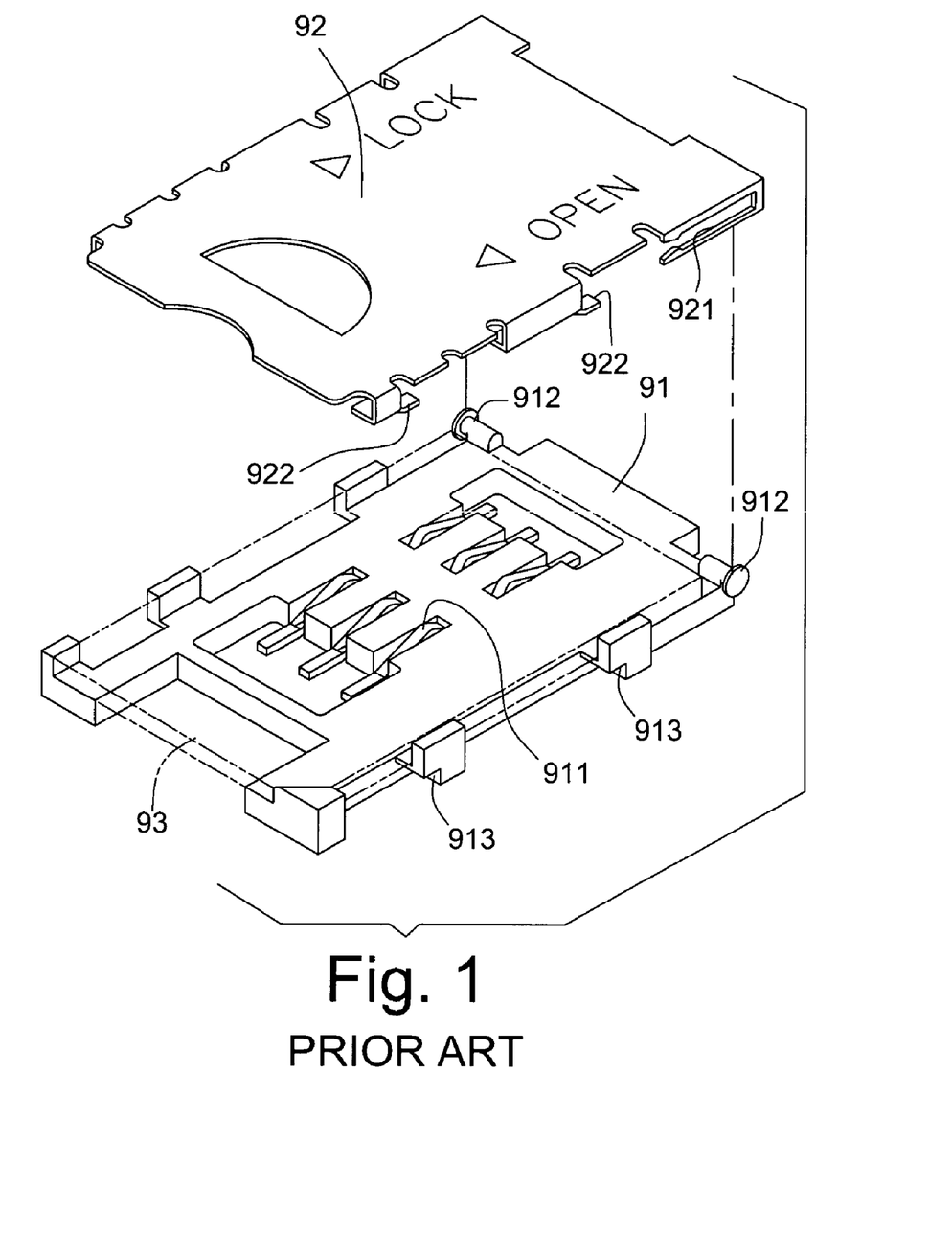
FIG. 1 is a perspective exploded view of a conventional SIM connector.
Figure 2:
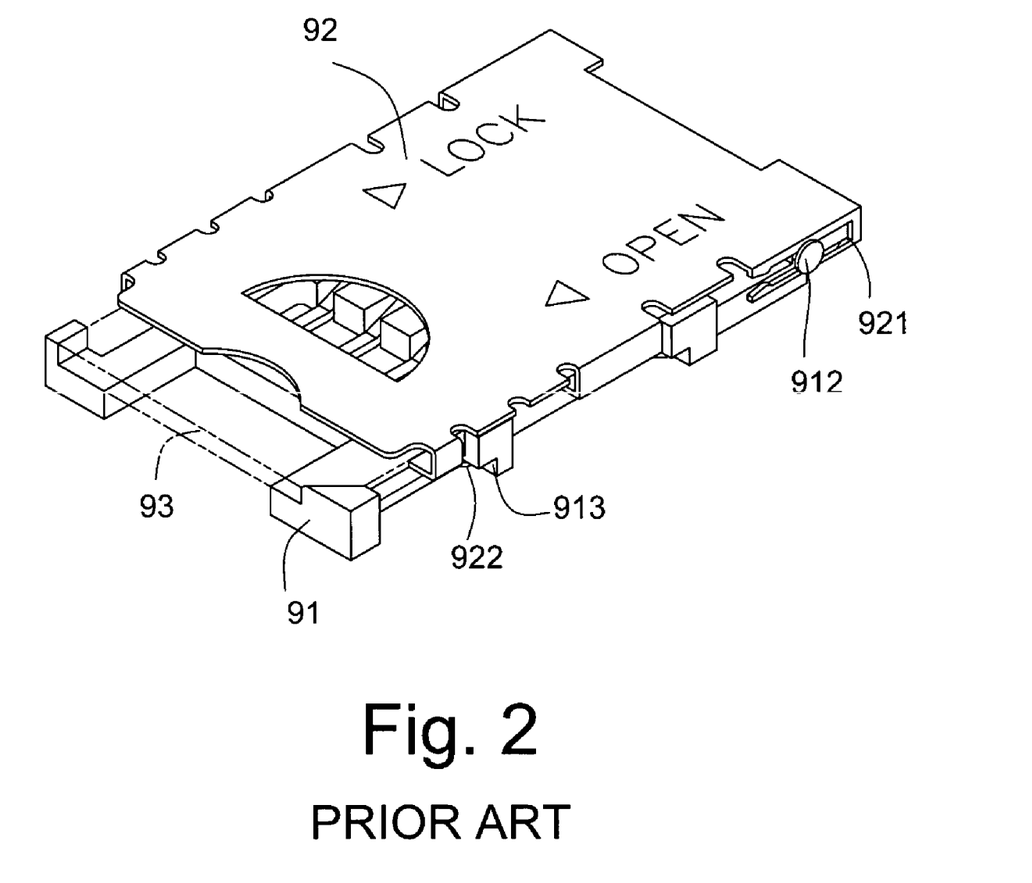
FIG. 2 is a perspective assembled view of the conventional SIM connector.
Figure 3:
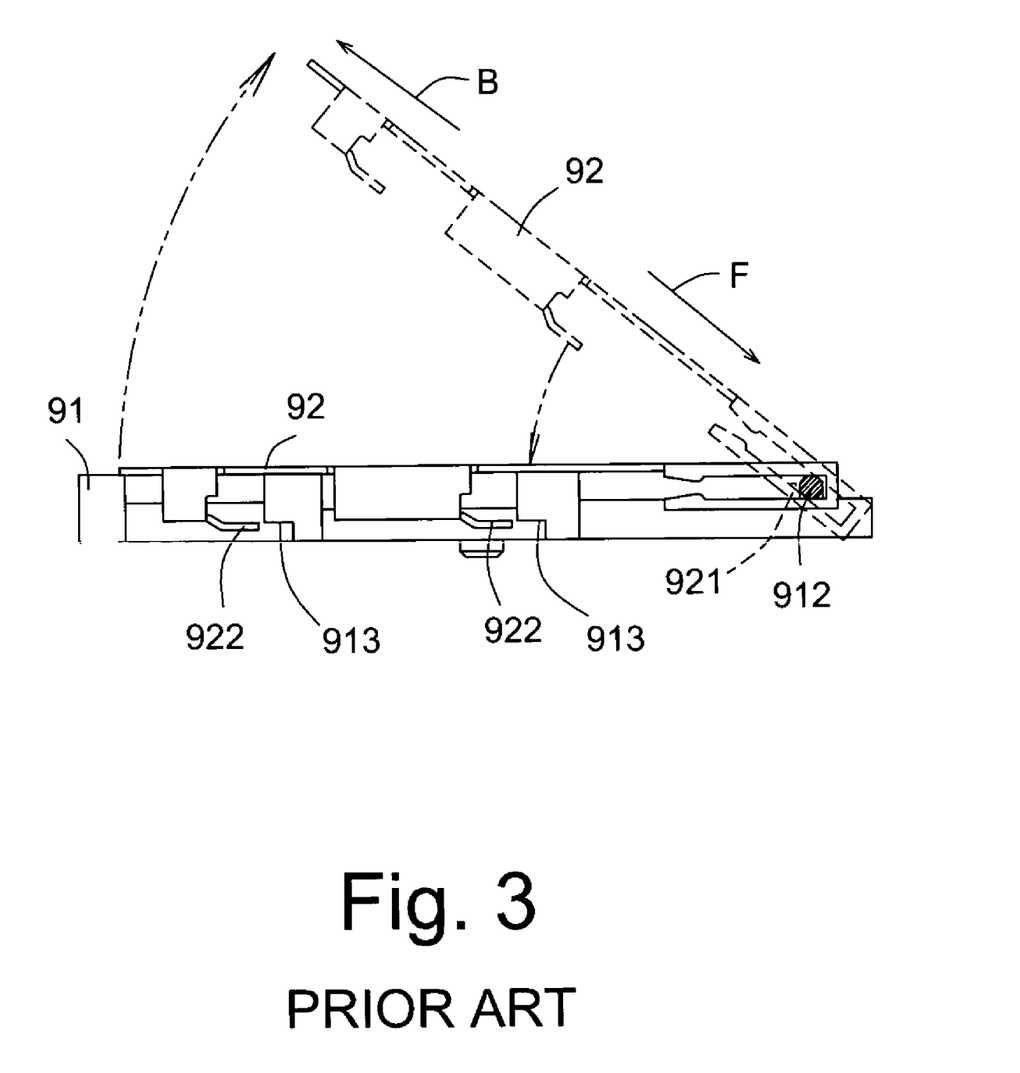
FIG. 3 is a side view showing the turning up operation of the cover body of the conventional SIM connector.

FIGS. 1, 2 and 3 show a current subscriber identity module (SIM) connector applied to mobile phone. The SIM connector includes a plastic main body 91 and a cover body 92. Multiple terminals 911 are inlaid in the plastic main body 91. One end of the cover body 92 is pivotally connected with the plastic main body 91. A SIM card 93 can be placed in the plastic main body 91. The cover body 92 can be turned to cover the SIM card 93 and clamp the SIM card 93 together with the plastic main body 91. Accordingly, the SIM card 93 can be electrically connected with the terminals 911.

Two sides of the cover body 92 are respectively formed with two slide slots 921. Two guide pins 912 are formed on two sides of the plastic main body 91 and pivotally fitted in the slide slots 921 of the cover body 92. Accordingly, the cover body 92 can be guided by the guide pins 912 to be stably transversely slid or turned upward. In use, such conventional structure has some shortcomings as follows:

1. As shown in FIG. 3, the cover body 92 has no locating structure in the slide slot 921. Therefore, when transferred or taken by a mechanical arm and mounted on a mobile phone, due to shock, the cover body 92 is apt to transverse slide and unlatch from the plastic main body 91 and automatically pivot up. This will affect the installation of the SIM connector on the mobile phone.

2. Referring to FIG. 3, when a user turns up the cover body 92, the cover body 92 will simultaneously slide forward F along the guide pins 912 (as shown by the phantom line). When the user places in the SIM card to close the cover body 92, since the cover body 92 has been displaced, the user needs to pull the cover body 92 rearward (in the direction of arrow B) and then close the cover body 92 to cover the SIM card. This is inconvenient to the user.

3. The cover body 92 has a longitudinally extending insertion plate 922, which is latched under a locating block 913 of the plastic main body 91. The insertion plate 922 is an elongated plate body which is apt to be bent and deformed.

SUMMARY OF THE INVENTION

It is therefore a primary object of the present invention to provide a cover body sliding/locating structure of SIM connector in which by means of the locating sections of the cartridge sections, the cover body can be temporarily located and prevented from sliding during turning up operation. Accordingly, when a user successively closes the cover body, the cover body can be directly downward closed to cover the plastic main body. This facilitates use and operation of the SIM connector.

It is a further object of the present invention to provide the above cover body sliding/locating structure of SIM connector in which when the cover body is closed to latch on the plastic main body, the locating sections of the cartridge section of the cover body will stop the outer edge of the plastic main body and prevent the cover body from freely sliding on the plastic main body. Therefore, during installation of the SIM connector, the cover body will not displace or automatically pivot outward. This facilitates installation of the SIM connector on a mobile phone.

It is still a further object of the present invention to provide the above cover body sliding/locating structure of SIM connector in which the lateral edges of the board body of the cover body are directly downward bent to form the L-shaped hook sections for hooking with the plastic main body. The L-shaped hook sections are not elongated sections so that when the cover body is slid to latch with the plastic main body, the L-shaped hook sections are not apt to deform. Therefore, the using life of the SIM connector is prolonged.

According to the above objects, the cover body sliding/locating structure of SIM connector includes: a plastic main body formed with multiple terminal cavities in which multiple terminals are respectively inlaid, two sides of one end of the plastic main body being respectively formed with two guide pins; and a cover body. Two sides of one end of the cover body are respectively bent to form two cartridge sections. A first end of the cartridge section is formed with a slide entrance in which the guide pin is pivotally fitted. At least one projecting locating section is disposed on inner side of the cartridge section for locating the cover body in a position where the cover body can be turned up or latched with the plastic main body. At least one projecting stopper board is formed at an opening of a second end of the cartridge section for stopping the guide pin. An L-shaped hook section downward projects from each lateral edge of the cover body for correspondingly hooking and latching with a locating block of the plastic main body.

The present invention can be best understood through the following description and accompanying drawings wherein:

DETAILED DESCRIPTION OF THE PREFERRED EMBODIMENT

Please refer to FIGS. 4 to 12. The present invention is related to a cover body sliding/locating structure of SIM connector. The SIM connector includes a plastic main body 1 and a cover body 3. Two sides of the cover body 3 are respectively formed with two cartridge sections 32. Two sides of a second end of the plastic main body 1 are respectively formed with two guide pins 13. The cartridge sections 32 are pivotally fitted on the guide pins 13. The inner side of each cartridge section 32 is formed with a projecting locating section 33. The projecting locating section 33 serves to locate the cover body 3 in a position where the cover body 3 is latched with the plastic main body 1 or the cover body 3 can be turned upward.

Figure 4:
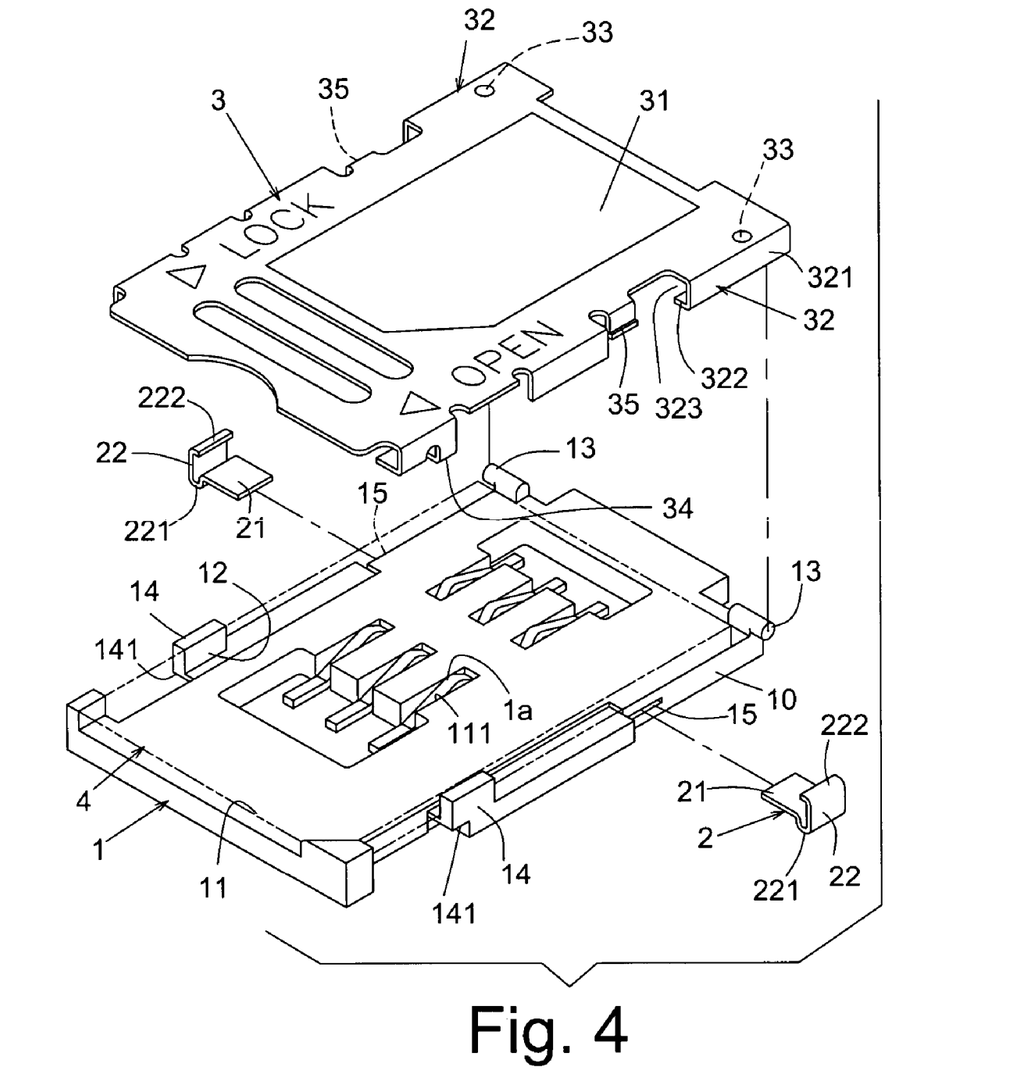
FIG. 4 is a perspective exploded view of the present invention.
Figure 5:
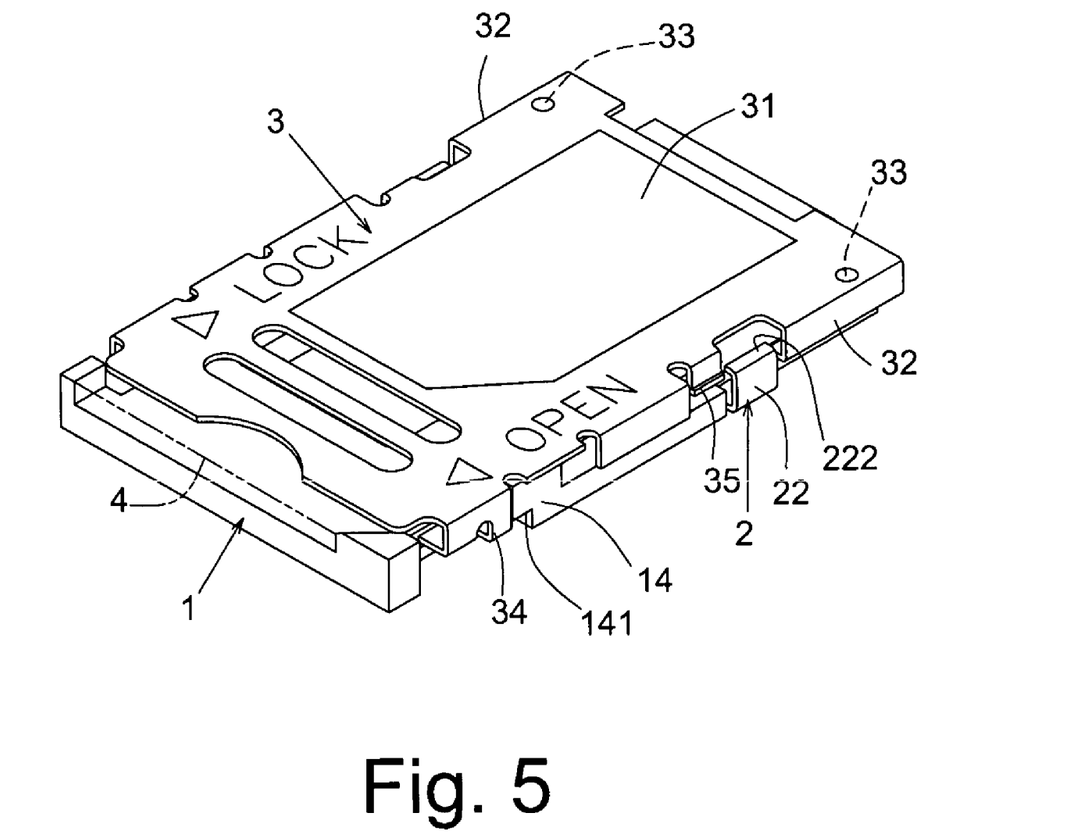
FIG. 5 is a perspective assembled view of the SIM connector of the present invention.

Referring to FIGS. 4 and 5, the plastic main body 1 includes a substrate 11. A receiving dent 12 is defined on the substrate 11. A SIM card 4 can be snugly accommodated in the receiving dent 12. The substrate 11 is formed with multiple terminal cavities 111 in which multiple terminals 1a are respectively inlaid. Two sides of a second end of the plastic main body 1 are respectively formed with two guide pins 13. At least one locating block 14 projects from a lateral edge of the plastic main body 1. A bottom section of the locating block 14 is formed with a latch dent 141.

Referring to FIG. 4, the cover body 3 is made of metal material. The cover body 3 includes board body 31 and two cartridge sections 32 integrally connected with two sides of a second end of the board body 31. Each cartridge section 32 has a sideboard 321. A top end of the sideboard 321 is integrally connected with a lateral edge of the board body 31. A bottom end of the sideboard 321 is inward bent to form a bottom board 322. The bottom board 322 and the board body 31 define therebetween a receiving space 30. The guide pin 13 of the plastic main body 1 is pivotally fitted in the receiving space 30. A first end of the cartridge section 32 is formed with a slide entrance 323. A projecting stopper board 324 is formed at the opening of a second end of the cartridge section 32 for abutting against outer side of the guide pin 13 to stop the guide pin 13 and prevent the cover body 3 from further displacing. At least one projecting locating section 33 slightly projects from inner side of the cartridge section 32 near the second end thereof. The locating section 33 serves to slide with the cover body 3 to stop a lateral side of the guide pin 13, whereby the cover body 3 is located in a position where the cover body 3 is latched with the plastic main body 1 or the cover body 3 can be turned upward. At least one L-shaped hook section 34 downward projects from an edge of the board body 31 for correspondingly hooking and latching in the latch dent 141 of the bottom of the locating block 14 of the plastic main body 1.

Figure 12:
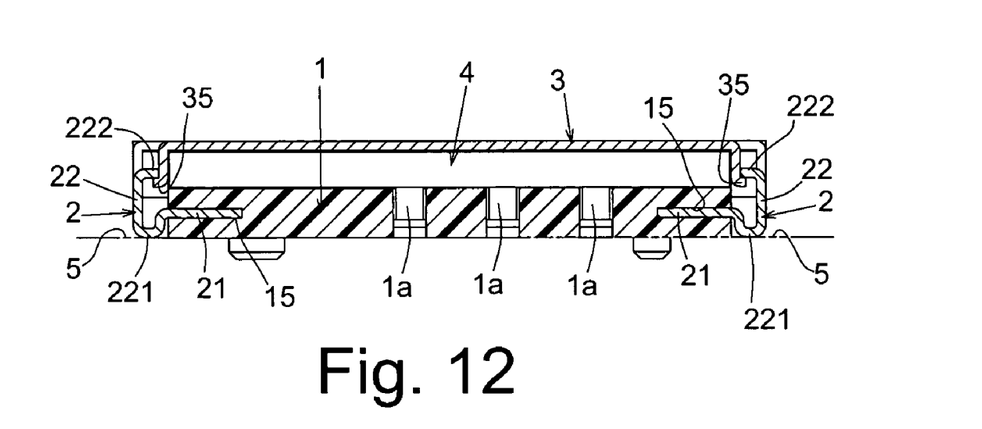
FIG. 12 is a sectional view taken along line 12—12 of FIG. 10.

Referring to FIGS. 4 and 12, the present invention further includes at least one grounding plate 2 made of metal board by integral punching. A first end of the grounding plate 2 is formed as an insertion end 21 which is tightly inserted in an insertion slit 15 of one side of the plastic main body 1. A bottom section 221 of a second end 22 of the grounding plate 2 always electrically contacts with a grounding circuit of a circuit board 5. A top section of the second end 22 is formed with a first adjoining section 222 for connecting on the cover body 3 to ground the cover body 3 and shield the SIM card from external static and magnetic wave. The second end 22 of the grounding plate 2 is formed with a substantially C-shaped cross-section or the like. This is not limited.

The cover body 3 has at least one second adjoining section 35 projecting from a lateral edge of the board body 31 of the cover body 3. When the cover body 3 is latched on the plastic main body 1, the second adjoining section 35 of the cover body 3 contacts with the first adjoining section 222 of the grounding plate 2 to electrically connect with the grounding circuit of the circuit board 5.

Figure 6:
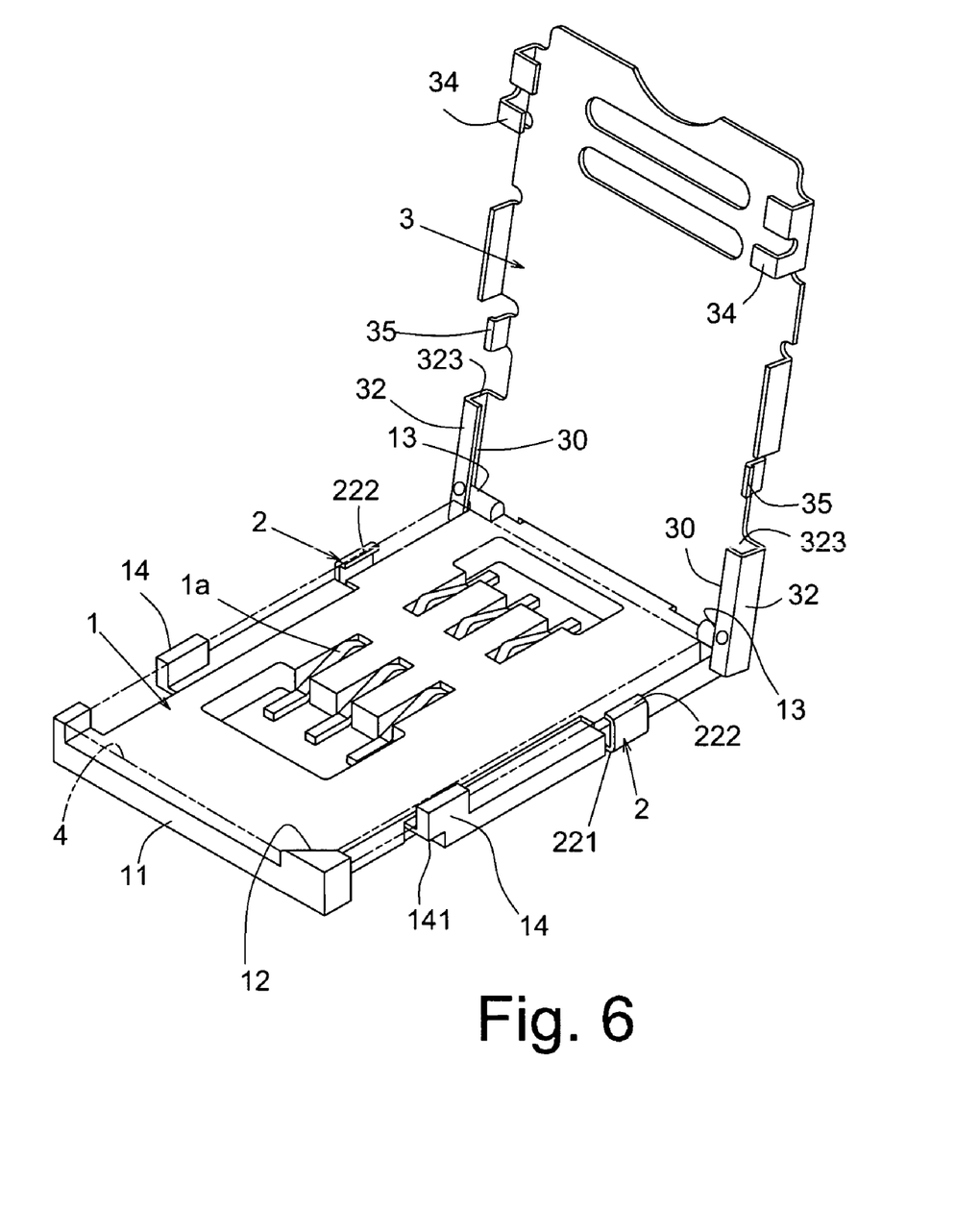
FIG. 6 is a perspective view showing that the cover body of the present invention is turned up.
Figure 7:
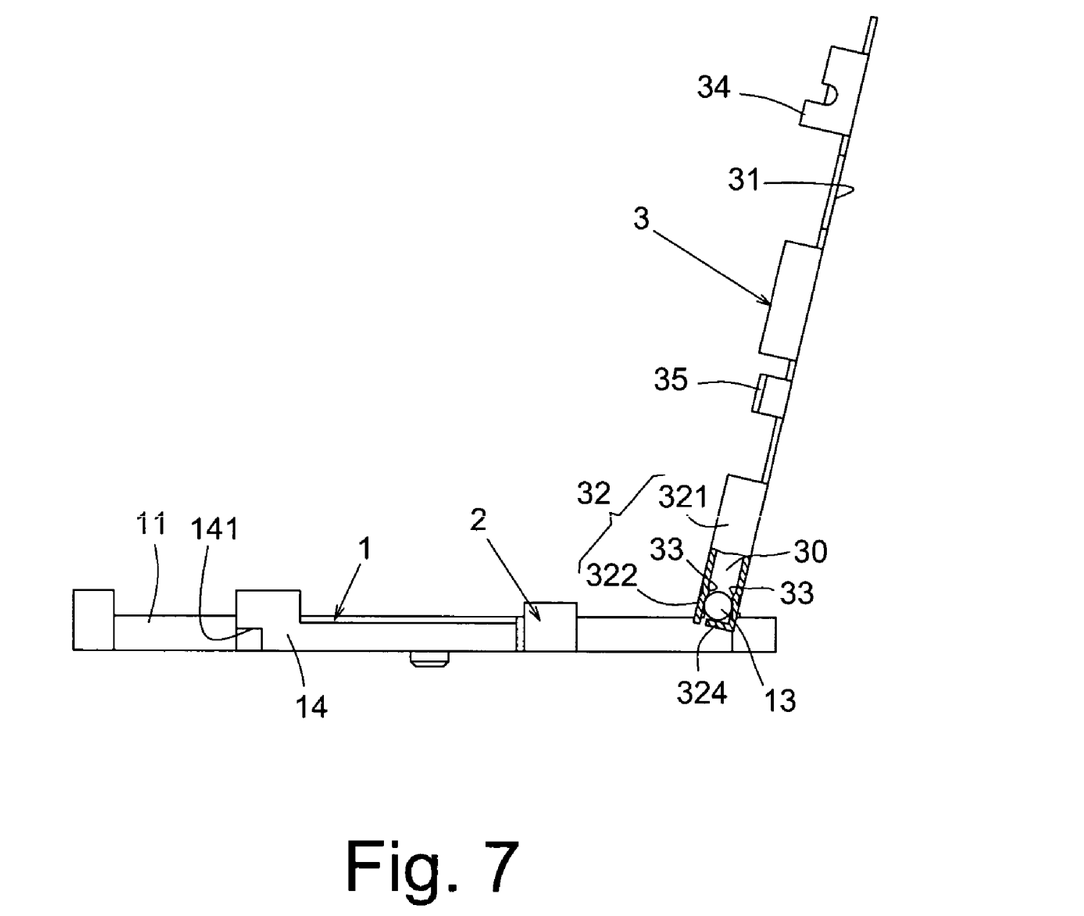
FIG. 7 is a side partially sectional view according to FIG. 6.
Figure 8:
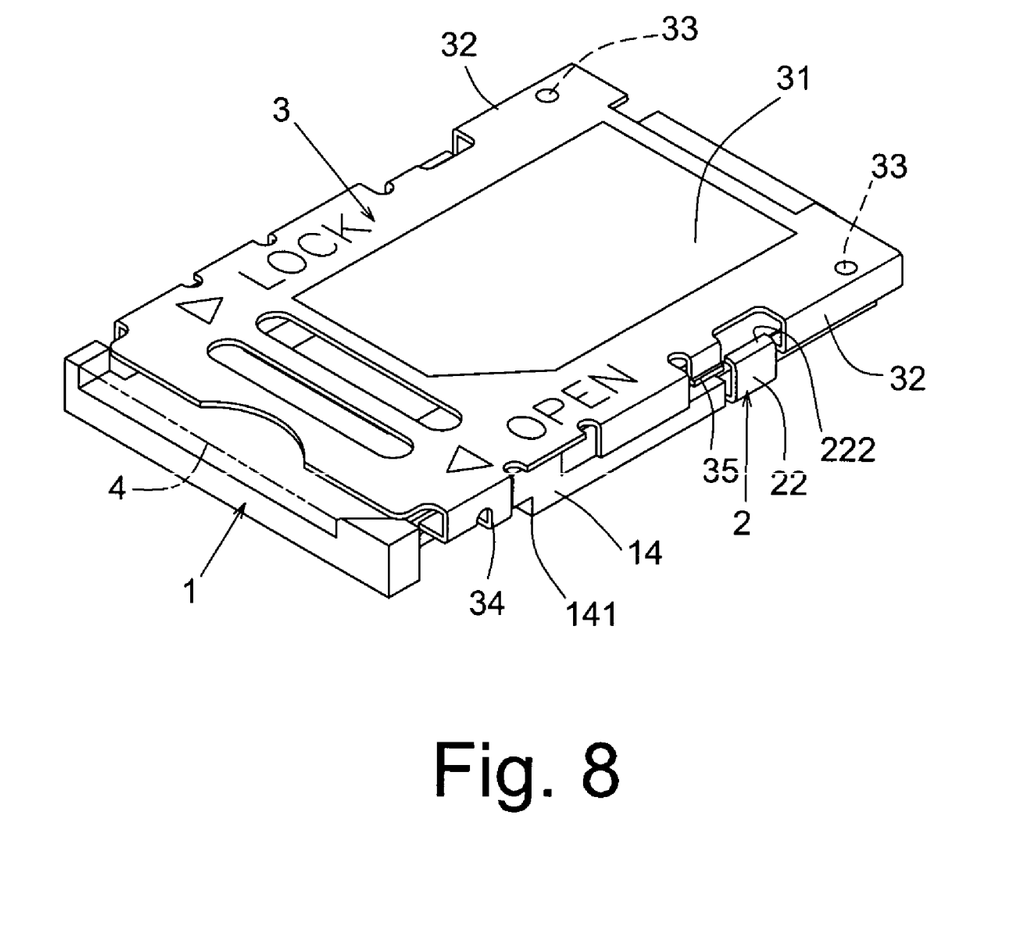
FIG. 8 is a perspective view according to FIG. 6, showing that the cover body is closed to cover the plastic main body of the present invention.
Figure 9:
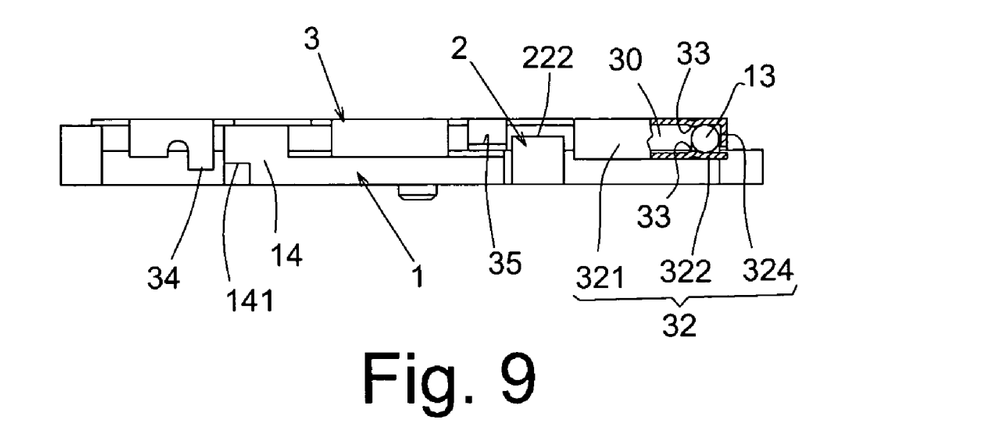
FIG. 9 is a side partially sectional view according to FIG. 8.

Referring to FIGS. 4 to 9, when assembled, the guide pins 13 of two sides of the plastic main body 1 are slid and fitted into the slide entrances 323 of the first ends of the cartridge sections 32 of the cover body 3. At this time, the cover body 3 can be freely pivotally rotated about the guide pins 13 on the plastic main body 1. Also, the cover body 3 can be guided by the guide pins 13 to stably transversely slide. Referring to FIGS. 5 to 7, in use of the present invention, the cover body 3 is first pulled toward the first end of the SIM connector to unlatch the L-shaped hook section 34 from the plastic main body 1. At this time, the guide pins 13 of the plastic main body 1 are relatively moved to a position between the locating sections 33 and the stopper boards 324 of the cartridge sections 32 of the cover body 3. Under such circumstance, the user can freely turn up the cover body 3 and place in a SIM card 4. In the turning up operation of the cover body 3, the guide pins 13 of the plastic main body 1 are restricted between the locating sections 33 and the stopper boards 324 of the cover body 3. Therefore, the cover body 3 is prevented from sliding. Accordingly, when the user successively closes the cover body 3 as shown in FIGS. 8 and 9, the cover body 3 is not slid so that the user can directly downward close the cover body 3. This facilitates use and operation of the SIM connector.

Figure 10:
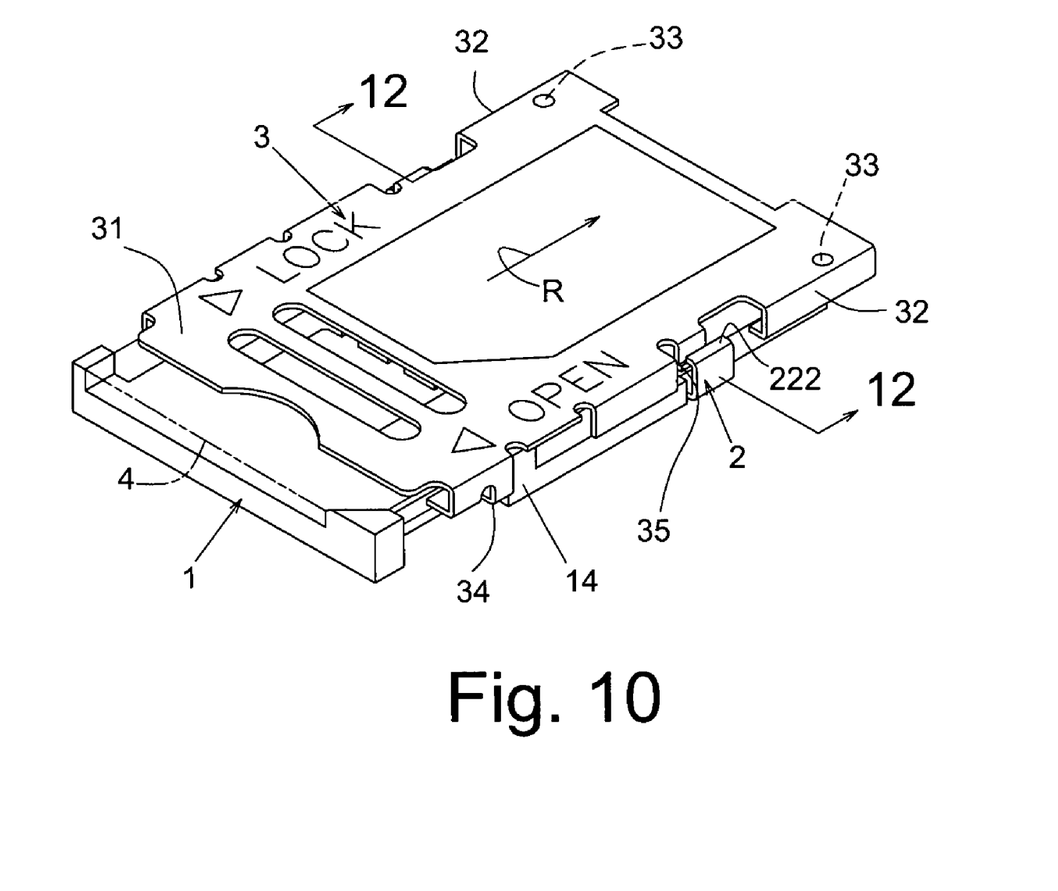
FIG. 10 is a perspective view showing that the cover body is slid to latch on the plastic main body of the present invention.
Figure 11:
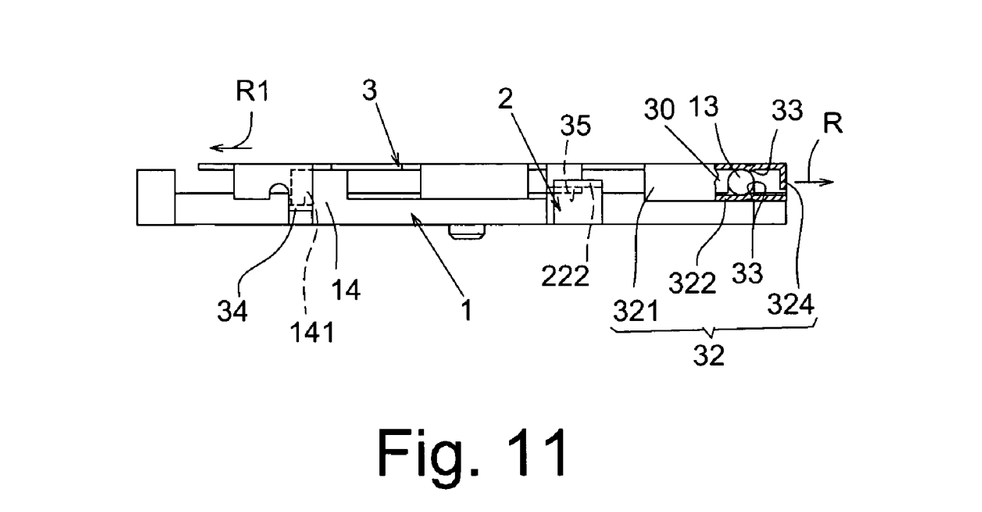
FIG. 11 is a side partially sectional view according to FIG. 10.

Referring to FIGS. 10 to 12, when the cover body 3 is slid and pushed in the direction R, the guide pins 13 of two sides of the plastic main body 1 will relatively slide out of the locating sections 33 of the cover body 3 and move to outer sides of the first ends of the locating sections 33. The L-shaped hook sections 34 of the cover body 3 will correspondingly hook and latch in the latch dents 141 of the bottoms of the locating blocks 14 of the plastic main body 1. The locating sections 33 stop the second ends of the guide pins 13 of the plastic main body 1. Therefore, when an ordinary external force is applied to the cover body 3 (for example, the shock during transfer or operation of a mechanical arm for mounting the SIM connector on a mobile phone), the cover body 3 will not displace in the direction R1. Accordingly, the cover body 3 can be firmly latched on the plastic main body 1 without pivoting up from the plastic main body 1 in the transfer or installation. Therefore, the installation is facilitated.

The above embodiment is only used to illustrate the present invention, not intended to limit the scope thereof. Many modifications of the above embodiment can be made without departing from the spirit of the present invention.

What is claimed is:

1. A cover body sliding/locating structure of subscriber identity module connector, comprising:
   (a) a plastic main body including a substrate, a receiving dent being defined on the substrate, whereby a subscriber identity module card can be snugly accommodated in the receiving dent, the substrate being formed with multiple terminal cavities in which multiple terminals are respectively inlaid, two sides of a second end of the plastic main body being respectively formed with two guide pins; and
   (b) a cover body including a board body and two cartridge sections integrally connected with two sides of a second end of the board body, each cartridge section having a sideboard, a top end of the sideboard being integrally connected with a lateral edge of the board body, a bottom end of the sideboard being inward bent to form a bottom board, the bottom board and the board body defining therebetween a receiving space, whereby the guide pin of the plastic main body is pivotally fitted in the receiving space, a first end of the cartridge section being formed with a slide entrance, a projecting stopper board being formed at an opening of a second end of the cartridge section for abutting against outer side of the guide pin to stop the guide pin and prevent the cover body from further displacing, at least one projecting locating section projecting from inner side of the cartridge section near the second end thereof, whereby the locating section can slide with the cover body to stop a lateral side of the guide pin so as to locate the cover body in a position where the cover body is latched with the plastic main body or the cover body can be turned upward.

2. The cover body sliding/locating structure of the subscriber identity module connector as claimed in claim 1, wherein at least one locating block projects from a lateral edge of the plastic main body, a bottom section of the locating block being formed with a latch dent, at least one L-shaped hook section downward projecting from an edge of the board body of the cover body for correspondingly hooking and latching in the latch dent of the bottom section of the locating block of the plastic main body.

3. The cover body sliding/locating structure of the subscriber identity module connector as claimed in claim 1, further comprising at least one grounding plate made of metal board by integral punching, a first end of the grounding plate being formed as an insertion end which is tightly inserted in an insertion slit of one side of the plastic main body, a bottom section of a second end of the grounding plate always electrically contacting with a grounding circuit of a circuit board, a top section of the second end being formed with a first adjoining section for connecting on the cover body to ground the cover body.

4. The cover body sliding/locating structure of the subscriber identity module connector as claimed in claim 3, wherein the cover body has at least one second adjoining section projecting from a lateral edge of the board body of the cover body, whereby when the cover body is latched on the plastic main body, the second adjoining section of the cover body contacts with the first adjoining section of the grounding plate to electrically connect with the grounding circuit of the circuit board.

* * * * *